United States Patent
Suzuki et al.

(10) Patent No.: US 7,911,322 B2
(45) Date of Patent: Mar. 22, 2011

(54) INFORMATION PROCESSING APPARATUS AND METHOD, AND NON-CONTACT IC CARD DEVICE

(75) Inventors: Mamoru Suzuki, Kanagawa (JP); Yoshihito Ishibashi, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 417 days.

(21) Appl. No.: 12/184,355

(22) Filed: Aug. 1, 2008

(65) Prior Publication Data

US 2009/0033488 A1  Feb. 5, 2009

(30) Foreign Application Priority Data

Aug. 2, 2007 (JP) .................. P2007-201592

(51) Int. Cl.
  *H04L 9/32* (2006.01)
  *H04B 1/38* (2006.01)
  *G06K 7/08* (2006.01)
(52) U.S. Cl. ........ 340/5.6; 340/5.62; 340/5.66; 235/450
(58) Field of Classification Search ........... 340/517, 340/551, 5.6, 5.62, 5.66, 500, 514, 515, 657, 340/661; 235/680, 382.5, 435, 449, 450, 235/493; 705/17, 28
See application file for complete search history.

(56) References Cited

U.S. PATENT DOCUMENTS

| | | | | |
|---|---|---|---|---|
| 4,791,285 A * | 12/1988 | Ohki | .............................. | 235/449 |
| 5,126,541 A * | 6/1992 | Shinagawa | .................... | 235/438 |
| 5,664,157 A * | 9/1997 | Takahira et al. | ................ | 703/23 |
| 6,045,042 A * | 4/2000 | Ohno | ............................. | 235/440 |
| 6,267,291 B1 * | 7/2001 | Blankenship et al. | ........ | 235/375 |
| 2007/0200680 A1* | 8/2007 | Colby | ......................... | 340/10.51 |

FOREIGN PATENT DOCUMENTS

| | | |
|---|---|---|
| EP | 492358 A1 * | 7/1992 |
| JP | 2002-236891 | 8/2002 |
| JP | 2003-208582 | 7/2003 |
| JP | 2004-272356 | 9/2004 |
| JP | 2005-293485 | 10/2005 |
| JP | 2007-133563 | 5/2007 |
| JP | 2007-188413 | 7/2007 |

* cited by examiner

*Primary Examiner* — Jennifer Mehmood
(74) *Attorney, Agent, or Firm* — Finnegan, Henderson, Farabow, Garrett & Dunner, L.L.P.

(57) ABSTRACT

An information processing method includes the steps of: detecting a magnetic field variation that occurs in the vicinity of a receiving section that receives a magnetic field signal; determining whether or not a detection result satisfies a predetermined condition that is set in advance; connecting a storage section, which stores information included in the magnetic field signal received by the receiving section, to the receiving section if it is determined that the detection result does not satisfy the condition; and connecting the storage section to a reading section that reads information stored on the storage section, if it is determined that the detection result satisfies the condition.

11 Claims, 10 Drawing Sheets

# INFORMATION PROCESSING APPARATUS AND METHOD, AND NON-CONTACT IC CARD DEVICE

CROSS REFERENCES TO RELATED APPLICATIONS

The present invention contains subject matter related to Japanese Patent Application JP 2007-201592 filed in the Japanese Patent Office on Aug. 2, 2007, the entire contents of which are incorporated herein by reference.

BACKGROUND OF THE INVENTION

1. Field of the Invention

The present invention relates to an information processing apparatus and method, and a non-contact IC card device. More specifically, the present invention relates to an information processing apparatus and method, and a non-contact IC card device which make it possible to achieve a reduction in power consumption.

2. Description of the Related Art

In the related art, there is a type of non-contact IC card that has an integrated circuit (IC chip) and an antenna built therein, and performs short-distance radio communication with another device such as a reader/writer. This non-contact IC card is small-sized and offers good portability. Also, the non-contact IC card is highly reliable since it uses an IC chip, and is thus frequently used as, for example, an ID card, a credit card, a point card, or the like for the purpose of authentication and settlement.

In recent years, there has been conceived an arrangement in which a small-sized display device is provided to the surface of this non-contact IC card, and information held on an IC chip, for example, ID information, account balance information, or historical information is displayed on the display device, thus enhancing the convenience of the card (see, for example, Japanese Unexamined Patent Application Publication No. 2003-208582).

At this time, by providing a battery as a power supply inside the non-contact IC card, the non-contact IC card allows display information stored on a memory within the IC chip to be displayed on the display device at an arbitrary timing in accordance with a user's operation. That is, the non-contact IC card allows the display contents of the display device to be updated at an arbitrary timing.

SUMMARY OF THE INVENTION

However, even when an update is made to the display contents in accordance with a user's operation, the display contents are not changed unless information stored on the memory has been updated, so this may result in an unnecessary updating process. Such an unnecessary updating process increases power consumption, which may cause a reduction in the possible driving time of the battery.

It is thus desirable to prevent an increase in power consumption in a device with display function due to unnecessary updating of display contents.

According to a first aspect (corresponding to an embodiment) of the present invention, there is provided an information processing apparatus including: receiving means for receiving a magnetic field signal; storage means for storing information included in the magnetic field signal received by the receiving means; detecting means for detecting a magnetic field variation that occurs in the vicinity of the receiving means; condition determining means for determining whether or not a detection result of the detecting means satisfies a predetermined condition that is set in advance; switching control means for controlling a switching section that switches a connection destination of the storage means on the basis of a determination result of the condition determining means; and reading means for reading information stored on the storage means if it is determined by the condition determining means that the detection result satisfies the condition, in which the switching control means controls the switching section to connect the storage means to the receiving means if it is determined by the condition determining means that the detection result does not satisfy the condition, and controls the switching section to connect the storage means to the reading means if it is determined by the condition determining means that the detection result satisfies the condition.

The condition may be set such that as the detection result, a magnitude of the magnetic field variation detected becomes larger than a predetermined threshold, and then becomes smaller than the threshold.

The condition may be set such that as the detection result, a magnitude of the magnetic field variation that has been detected becomes larger than a predetermined threshold, and then becomes smaller than the threshold after elapse of a predetermined time.

The information processing apparatus may further include holding means for holding information, and held information updating means for updating information held on the holding means by using the information read from the storage means by the reading means.

The information processing apparatus may further include display means for displaying image information, and display updating means for updating the image information to be displayed by the displayed means by using the information held by the holding means.

The information processing apparatus may further include time measuring means for measuring time, the switching control means may control the switching section to connect the storage means to the reading means if it is determined by the condition determining means that the detection result satisfies the condition, and when it is further determined by the time measuring means that a predetermined time has elapsed, the switching control means may control the switching section to connect the storage means to the receiving means.

The information processing apparatus may further include magnetic field variation determining means for determining whether or not the magnetic field variation has occurred in the vicinity of the receiving means on the basis of the detection result of the detecting means, and the switching control means may control the switching section to connect the storage means to the receiving means if it is further determined by the magnetic variation determining means that the magnetic field variation has occurred in the vicinity of the receiving means.

According to the first aspect of the present invention, there is also provided an information processing method including the steps of: detecting a magnetic field variation that occurs in the vicinity of a receiving section that receives a magnetic field signal; determining whether or not a detection result satisfies a predetermined condition that is set in advance; connecting a storage section, which stores information included in the magnetic field signal received by the receiving section, to the receiving section if it is determined that the detection result does not satisfy the condition; and connecting the storage section to a reading section that reads information stored on the storage section, if it is determined that the detection result satisfies the condition.

According to a second aspect of the present invention, there is provided a non-contact IC card device which has an antenna that receives a magnetic field signal transmitted from another device, a memory that stores information included in the magnetic field signal received via the antenna, and a display device that displays information, including: detecting means for detecting a magnetic field variation that occurs in the vicinity of the antenna; condition determining means for determining whether or not a detection result of the detecting means satisfies a predetermined condition that is set in advance; switching control means for controlling an electronic switch, which switches a connection destination of the memory on the basis of a determination result of the condition determining means, to connect the memory to the antenna if it is determined that the detection result does not satisfy the condition, and to detach the memory from the antenna if it is determined that the detection result satisfies the condition; and display control means for reading information stored on the memory for display on the display device, in a state in which the memory is detached from the antenna by control of the switching control means.

In the first aspect of the present invention, a magnetic field variation that occurs in the vicinity of a receiving section that receives a magnetic field signal is detected, whether or not a detection result satisfies a predetermined condition that is set in advance is determined, a storage section that stores information included in the magnetic field signal received by the receiving section is connected to the receiving section if it is determined that the detection result does not satisfy the condition, and the storage section is connected to a reading section that reads information stored on the storage section if it is determined that the detection result satisfies the condition.

In the second aspect of the present invention, a magnetic field variation that occurs in the vicinity of the antenna is detected, whether or not a detection result satisfies a predetermined condition that is set in advance is determined, an electronic switch that switches a connection destination of the memory is switched on the basis of the determination result is controlled so that the memory is connected to the antenna if it is determined that the detection result does not satisfy the condition, and the memory is detached from the antenna if it is determined that the detection result satisfies the condition, and information stored on the memory is read in that state for display on the display device.

According to the present invention, it is possible to prevent an increase in power consumption. In particular, it is possible to prevent an increase in power consumption in a device with display function due to unnecessary updating of display contents.

DESCRIPTION OF THE PREFERRED EMBODIMENTS

Figure 1:
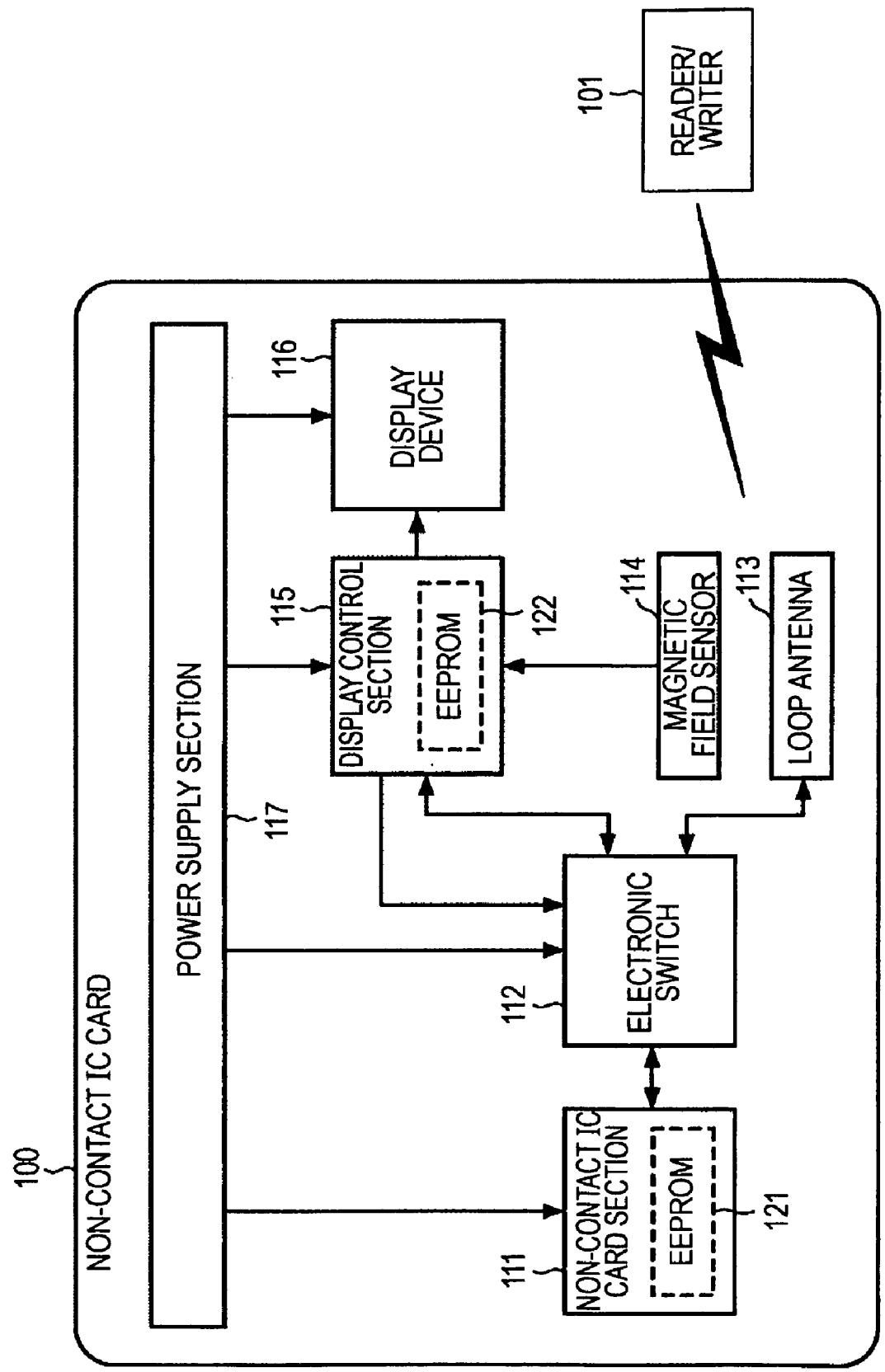
FIG. 1 is a block diagram showing an example of the configuration of a non-contact IC card according to an embodiment of the present invention.

Before describing an embodiment of the present invention, the correspondence between the features of the present invention and embodiments disclosed in the specification and drawings is discussed below. This description is intended to assure that an embodiment(s) supporting the present invention are described in the specification and drawings. Thus, even if an embodiment in the following description is described in the specification and drawings but is not described as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

According to a first aspect of the present invention, there is provided an information processing apparatus (for example, a non-contact IC card 100 in FIG. 1) including: receiving means (for example, a loop antenna 113 in FIG. 1) for receiving a magnetic field signal; storage means (for example, an EEPROM 121 in FIG. 1) for storing information included in the magnetic field signal received by the receiving means; detecting means (for example, a magnetic field sensor 114 in FIG. 1) for detecting a magnetic field variation that occurs in the vicinity of the receiving means; condition determining means (for example, a condition determining section 131 in FIG. 2) for determining whether or not a detection result of the detecting means satisfies a predetermined condition that is set in advance; switching control means (for example, an electronic switch control section 132 in FIG. 2) for controlling a switching section (for example, an electronic switch 112 in FIG. 1) that switches a connection destination of the storage means on the basis of a determination result of the condition determining means; and reading means (for example, an information reading section 134 in FIG. 2) for reading information stored on the storage means if it is determined by the condition determining means that the detection result satisfies the condition, in which the switching control means controls the switching section to connect the storage means to the receiving means if it is determined by the condition determining means that the detection result does not satisfy the condition, and controls the switching section to connect the storage means to the reading means if it is determined by the condition determining means that the detection result satisfies the condition.

The information processing apparatus may further include holding means (for example, an EEPROM 122 in FIG. 1) for holding information, and held information updating means (for example, held data updating section 135 in FIG. 2) for updating information held on the holding means by using the information read from the storage means by the reading means.

The information processing apparatus may further include display means (for example, a display device 116 in FIG. 1) for displaying image information, and display updating means (for example, a display updating section 136 in FIG. 2) for updating the image information to be displayed by the displayed means by using the information held by the holding means.

The information processing apparatus may further include time measuring means (for example, a time measuring section 133 in FIG. 2) for measuring time, the switching control means may control the switching section to connect the storage means to the reading means if it is determined by the condition determining means that the detection result satisfies the condition, and when it is further determined by the time measuring means that a predetermined time has elapsed, the switching control means may control the switching section to connect the storage means to the receiving means.

Figure 2:
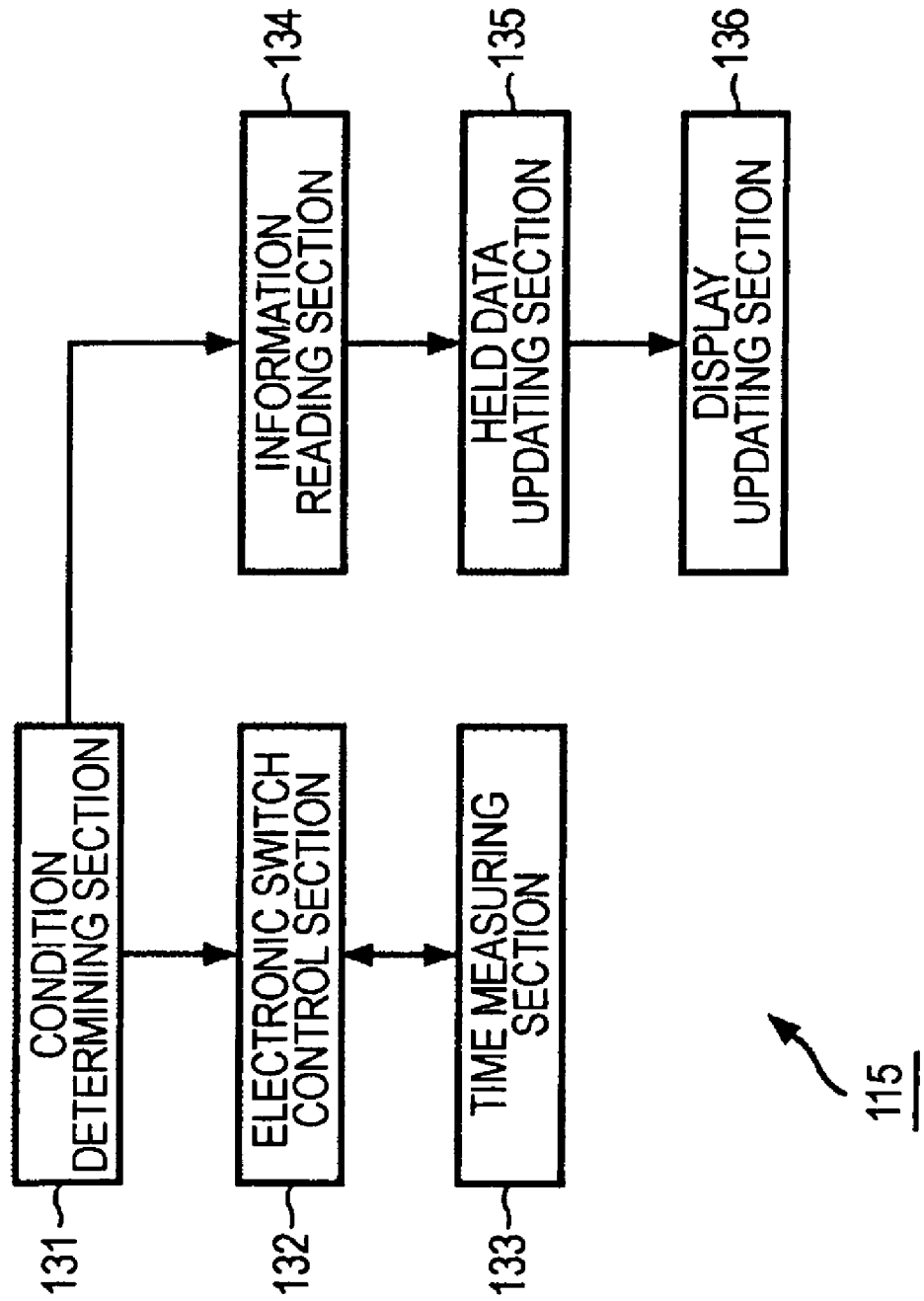
FIG. 2 is a functional block diagram showing an example of functions included in a display control section shown in FIG. 1.

The information processing apparatus may further include magnetic field variation determining means (for example, a magnetic field variation determining section 231 in FIG. 2) for determining whether or not the magnetic field variation has occurred in the vicinity of the receiving means on the basis of the detection result of the detecting means, and the switching control means may control the switching section to connect the storage means to the receiving means if it is further determined by the magnetic variation determining means that the magnetic field variation has occurred in the vicinity of the receiving means.

Figure 4:
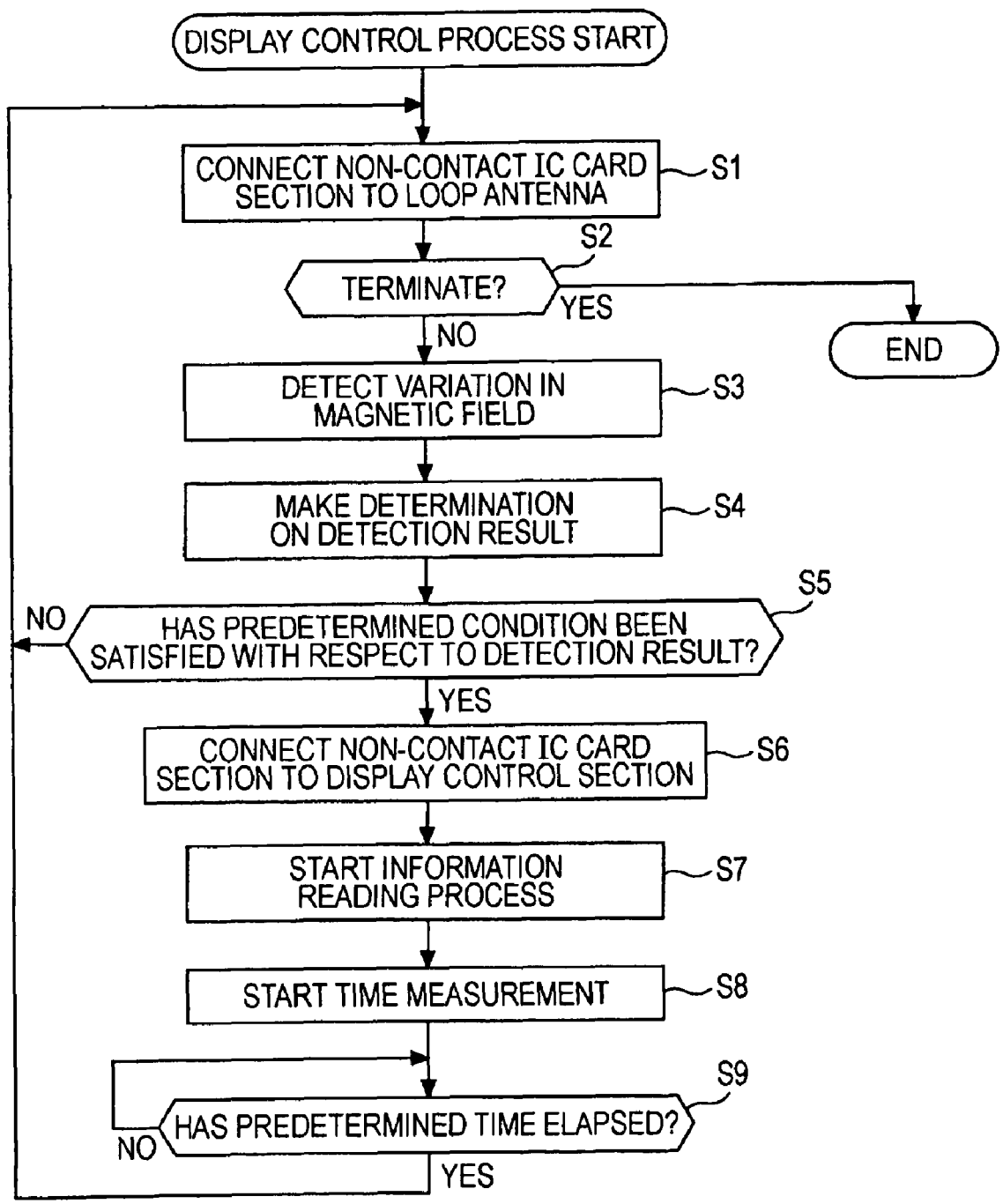
FIG. 4 is a flowchart illustrating an example of the flow of a display control process.

According to the first aspect of the present invention, there is also provided an information processing method including the steps of: detecting a magnetic field variation that occurs in the vicinity of a receiving section (for example, a loop antenna in FIG. 1) that receives a magnetic field signal (for example, step S3 in FIG. 4); determining whether or not a detection result satisfies a predetermined condition that is set in advance (for example, step S4 in FIG. 4); connecting a storage section (for example, an EEPROM 121 in FIG. 1), which stores information included in the magnetic field signal received by the receiving section, to the receiving section if it is determined that the detection result does not satisfy the condition (for example, step S1 in FIG. 4); and connecting the storage section to a reading section (for example, a display control section 115 in FIG. 1) that reads information stored on the storage section, if it is determined that the detection result satisfies the condition (for example, step S6 in FIG. 4).

According to a second aspect of the present invention, there is provided a non-contact IC card device (for example, a non-contact IC card 100 in FIG. 1) which has an antenna (for example, a loop antenna 113 in FIG. 1) that receives a magnetic field signal transmitted from another device (for example, a reader/writer 101 in FIG. 1), a memory (for example, an EEPROM 121 in FIG. 1) that stores information included in the magnetic field signal received via the antenna, and a display device (for example, a display device 116 in FIG. 1) that displays information, including: detecting means (for example, a magnetic field sensor 114 in FIG. 1) for detecting a magnetic field variation that occurs in the vicinity of the antenna; condition determining means (for example, a condition determining section 131 in FIG. 2) for determining whether or not a detection result of the detecting means satisfies a predetermined condition that is set in advance; switching control means (for example, an electronic switch control section 132 in FIG. 2) for controlling an electronic switch (for example, an electronic switch 112 in FIG. 1), which switches a connection destination of the memory on the basis of a determination result of the condition determining means, to connect the memory to the antenna if it is determined that the detection result does not satisfy the condition, and to detach the memory from the antenna if it is determined that the detection result satisfies the condition; and display control means (for example, an information reading section 134 and a display updating section 136 in FIG. 2) for reading information stored on the memory for display on the display device, in a state in which the memory is detached from the antenna by control of the switching control means.

Hereinbelow, an embodiment of the present invention will be described.

FIG. 1 is a diagram showing an example of the configuration of a non-contact IC card according to an embodiment of the present invention.

In FIG. 1, a non-contact IC card 100 is a card-type device with an integrated circuit (IC chip) and an antenna built therein, and performs short-distance radio communication with another device such as a reader/writer. The non-contact IC card 100 is a non-contact IC card with display function which also has a display function of displaying information or the like held on the IC chip. The non-contact IC card 100 is small-sized and offers good portability. Also, the non-contact IC card 100 is highly reliable since it uses an IC chip, and is thus used as, for example, an ID card, a credit card, a point card, or the like for the purpose of authentication and settlement.

As shown in FIG. 1, the non-contact IC card 100 has a non-contact IC card section 111, an electronic switch 112, a loop antenna 113, a magnetic field sensor 114, a display control section 115, a display device 116, and a power supply section 117.

The non-contact IC card section 111 is a processing section that carries out control processing and computation processing for realizing the function of the non-contact IC card section 111 as a so-called non-contact IC card. Normally, the non-contact IC card section 111 is provided in the form of a semiconductor integrated circuit (IC chip) inside the card. The non-contact IC card section 111 has a built-in EEPROM (Electronically Erasable and Programmable Read Only Memory) 121, and stores information included in a signal transmitted from the reader/writer 101 and received by the loop antenna 113, onto the EEPROM 121. The non-contact IC card section 111 also reads information stored on the EEPROM 121 on the basis of a request from the reader/writer 101 or the display control section 115, and supplies the information to the request originator.

The electronic switch 112 is a switch circuit configured as switching means for switching the connection destination of a signal input/output terminal of the non-contact IC card section 111. The electronic switch 112 is a three terminal switch that connects one terminal to either of the other two terminals. The electronic switch 112 connects the non-contact IC card section 111 to either the loop antenna 113 or the display control section 115. The operation of the electronic switch 112 is controlled by the display control section 115. That is, the connection destination of the signal input/output terminal of the non-contact IC card section 111 is switched on the basis of the control of the display control section 115. Any kind of switch may be used as the electronic switch 112 as far as it allows the signal input/output terminal of the non-contact IC card section 111 to be connected to at least the loop antenna 113 and the display control section 115. It should be noted, however, that the simpler the configuration of the electronic switch 112, the smaller the circuit scale, and the easier the control, thus allowing a reduction in cost.

The loop antenna 113 is configured as a receiving section that receives a magnetic field signal. The loop antenna 113 detects and receives a variation in magnetic field inside the loop due to electromagnetic waves transmitted from the reader/writer 101 arranged in close proximity to the non-contact IC card 100, as a magnetic field signal. The loop antenna 113 supplies the received magnetic field signal to the non-contact IC card section 111 via the electronic switch 112.

The magnetic field sensor 114 detects a variation in magnetic field that occurs in the vicinity of the loop antenna 113. The magnetic field sensor 114 supplies a detection result to the display control section 115. Any kind of sensor may be used as the magnetic field sensor 114. It should be noted, however, that since the magnetic field sensor 114 is designed to detect a magnetic field signal transmitted from the reader/writer 101, it is desirable that its receptivity for a magnetic field signal, that is, its detectivity for a magnetic field variation be approximated or matched to that of the loop antenna 113.

For example, if the magnetic field sensor 114 is configured to be capable of detecting magnetic field variations smaller than a magnetic field variation due to a magnetic field signal transmitted from the reader/writer 100, the sensitivity of the magnetic field sensor 114 is so high that even unnecessary magnetic field variations, that is, those magnetic field variations which are not attributable to a magnetic field signal may be detected. Conversely, if the sensitivity of the magnetic field sensor 114 is lowered so that the magnetic field sensor 114 can detect only magnetic field variations larger than the magnetic field variation that is received as a magnetic field signal by the loop antenna 113, it may become difficult to detect a magnetic field variation due to a magnetic field signal. Therefore, it is desirable to approximate or match the sensitivity of the magnetic field sensor 114 to the sensitivity of the loop antenna 113.

To prohibit the magnetic field signal receiving condition, it is desirable that the magnetic field sensor 114 be provided in the vicinity of the loop antenna 113, and that the magnetic field sensor 114 used is of the same structure as that of the loop antenna. For example, a coil arranged so as to be insulated from and superimposed over the loop antenna 113 and having the same shape as that of the loop antenna 113 may be used as the magnetic field sensor 114.

The display device 116 is configured by a small-sized display device that can display characters and images, such as an LCD (Liquid Crystal Display), an organic EL (ElectroLuminescence) display, or electronic paper. Although any kind of display may be employed as the display device 116, it is desirable that the display device 116 be sufficiently small, thin, and lightweight to allow its incorporation into a card-type device. As for the display capability, it is desirable that the display device 116 be sufficiently high definition to ensure that a certain amount of information can be displayed. It should be noted, however, that it is desirable to make the development cost, manufacturing cost, power consumption, and the like of the display device 116 as low as possible.

The power supply section 117 supplies power as required to individual sections built in the non-contact IC card 100, such as the non-contact IC card section 111, the electronic switch 112, the display control section 115, and the display device.

The display control section 115 is a processing section that controls the display of information on the display device 116. The display control section 115 acquires information stored on the EEPROM 121 from the non-contact IC card section 111 via the electronic switch 112, and displays that information (or information created on the basis of that information) on the display device 116.

The display control section 115 controls the electronic switch 112 on the basis of the detection result on magnetic field variation supplied from the magnetic field sensor 114. That is, if the detection result acquired from the magnetic field sensor 114 satisfies a predetermined condition, the display control section 115 controls the electronic switch 112 to detach the non-contact IC card section 111 from the loop antenna 113 and connect the non-contact IC card section 111 to the display control section 115. While this control disables the non-contact IC card 100 to communicate with the reader/writer 101, the display control section 115 is connected with the non-contact IC card section 111, so information can be acquired from the non-contact IC card section 111.

Conversely, if the detection result acquired from the magnetic field sensor 114 does not satisfy the predetermined condition, the display control section 115 controls the electronic switch 112 to detach the non-contact IC card section 111 from the display control section 115 and connect the non-contact IC card section 111 to the loop antenna 113. This enables the non-contact IC card 100 to communicate with the reader/writer 101. However, since the display control section 115 is disconnected from the non-contact IC card section 111, information cannot be acquired from the non-contact IC card section 111.

Further, the display control section 115 has an EEPROM 122 as a holding section. The display control section 115 can hold information acquired from the non-contact IC card section 111 on the EEPROM 122. This makes it possible for the display control section 115 to display information acquired from the non-contact IC card section 111 on the display device at an arbitrary timing.

FIG. 2 is a functional block diagram showing functions included in the display control section 115. As shown in FIG. 2, the display control section 115 has a condition determining section 131, an electronic switch control section 132, a time measuring section 133, an information reading section 134, a held data updating section 135, and a display updating section 136.

The condition determining section 131 is a processing section configured as condition determining means for determining whether or not the detection result supplied from the magnetic field sensor 114 satisfies a predetermined condition that is set in advance. This condition is arbitrarily. If it id determined that the detection result satisfies the condition, the condition determining section 131 determines that information stored on the EEPROM 121 has been updated, and controls the electronic switch control section 132 to operate the electronic switch 112 to connect the non-contact IC card section 111 to the display control section 115, and causes the information reading section 134 to execute reading of information from the EEPROM 121.

The electronic switch control section 132 is a processing section configured as switching control means for controlling the electronic switch 112 that switches the connection destination of the non-contact IC card section 111 (that is, the EEPROM 121) on the basis of the result of determination by the condition determining section 131. If it is determined by the condition determining section 131 that the detection result of the magnetic field sensor 114 has satisfied a predetermined condition, the electronic switch control section 132 controls the electronic switch 112 to switch the connection destination of the non-contact IC card section 111 from the loop antenna 113 to the display control section 115. That is, by switching the electronic switch 112, the electronic switch control section 132 switches the operation mode of the non-contact IC card 100 from a normal mode, in which the non-contact IC card communicates with the external reader/writer 101 and stores information supplied from the reader/writer 101 onto the EEPROM 121, to a read mode for reading information stored on the EEPROM 121.

The time measuring section 133 is a processing section configured as time measuring means for measuring time. The time measuring section 133 measures the time elapsed after the electronic switch control section 132 controls the electronic switch 112 to switch the connection destination of the non-contact IC card section 111 from the loop antenna 113 to the display control section 115, by a predetermined method. Upon the elapse of a predetermined time that is set in advance, the time measuring section 133 issues a notification to that effect to the electronic switch control section 132. The electronic switch control section 132 having received the notification controls the electronic switch 112 to switch the connection destination of the non-contact IC card section 111 (EEPROM 121) from the display control section 115 to the loop antenna 113. That is, upon the elapse of a predetermined time after the operation mode of the non-contact IC card 100 is switched to the read mode, the electronic switch control section 132 returns the operation mode to the original normal mode.

As described above, the electronic switch control section 132 can switch the operation mode of the non-contact IC card 100 on the basis of the determination result of the condition determining section 131, and the time measurement result of the time measuring section 133. That is, cumbersome operations related to the switching of operation mode (display of information), such as a designation or the like by the user or the like, become unnecessary, thereby preventing a reduction in the convenience of the non-contact IC card 100.

It should be noted that the method of time measurement by the time measuring section 133 is arbitrary. For example, the time measuring section 133 may have a built-in oscillator that oscillates at a predetermined cycle and perform time measurement on the basis of the oscillator, may acquire a synchronizing signal from the outside and perform time measurement on the basis of the synchronizing signal, or may perform time measurement by other such methods. Further, the time for which the time measuring section 133 performs time measurement (time duration of the read mode) is also arbitrary. It should be noted, however, that since the information reading section 134 reads information from the EEPROM 121 during this read mode, it is desirable that the time duration of the read mode be sufficiently long relative to the time required for the reading of information. However, since an increase in the time duration of the read mode leads to an increase in the time required until the operation returns to the normal mode, unduly increasing the time duration of the read mode may lead to a reduction in convenience as a non-contact IC card.

When the non-contact IC card section 111 is connected to the display control section 115 by means of the electronic switch 112, the information reading section 134 requests the non-contact IC card section 111 to read information held on the EEPROM 121. The method of making this read request is arbitrary, and although a dedicated read instruction may be provided, for example, if the same control command as that used when the reader/writer 101 requests the non-contact IC card section 111 for information stored on the EEPROM 121, this makes the development of the non-contact IC card section 111 easy.

It should be noted that the information reading section 134 may be able to request for the entirety or an arbitrary part of the information stored on the EEPROM 121, or may be able to request only for specific information, or information stored at a specific address. Further, in order to prevent information leakage, data tampering, or the like, a predetermined password, authentication ID, or the like may be required for the information reading section 134 to request for reading of information.

Upon acquiring an information reading request from the information reading section 134, the non-contact IC card section 111 reads the requested information from the EEPROM 121, and supplies the information to the information reading section 134. Upon acquiring the information, the information reading section 134 supplies the information to the held data updating section 135.

The held data updating section 135 updates information held on the EEPROM 122 by using the information read from the EEPROM 121 by the information reading section 134. The method of updating information is arbitrary. For example, the held data updating section 135 may write the information read from the EEPROM 121 by the information reading section 134 over or additionally to information held on the EEPROM 122, thereby updating the information held on the EEPROM 122. Further, for example, the held data updating section 135 may perform predetermined computation processing using the information read from the EEPROM 121 by the information reading section 134, and the information held on the EEPROM 122 to thereby create new information, and holds the new information on the EEPROM 122.

When information on the EEPROM 122 is updated by the held data updating section 135, the display updating section 136 reads the updated information from the EEPROM 122, and causes that information or another information created from that information to be displayed on the display section 116. That is, when information held on the EEPROM 122 is updated, the display updating section 136 updates the contents of display on the display device 116 by using the updated information. The display device 116 can thus display the latest information held on the EEPROM 122.

As described above, the display control section 115 includes the condition determining section 131 that determines whether or not the detection result of the magnetic field sensor 114 satisfies a predetermined condition that is set in advance, the electronic switch control section 134 that controls the electronic switch 112 that switches the connection destination of the non-contact IC card section 111 (EEPROM 121) on the basis of the result of determination by the condition determining section 131, and the information reading section 134 that reads information stored on the EEPROM 121. The display control section 115 may further include the time measuring section 133 that measures time. The display control section 115 may further include the EEPROM 122 that holds information, and the held data updating section 135 that updates the information held on the EEPROM 122 by using the information read from the EEPROM 121 by the information reading section 134. The display control section 115 may further include the display updating section 136 that updates information to be displayed by the display device 116, by using the information held on the EEPROM 122.

Next, referring to FIG. 3, a description will be given of the relationship between the detection result of the magnetic field sensor 114 and the switching of the electronic switch 112.

Figure 3:
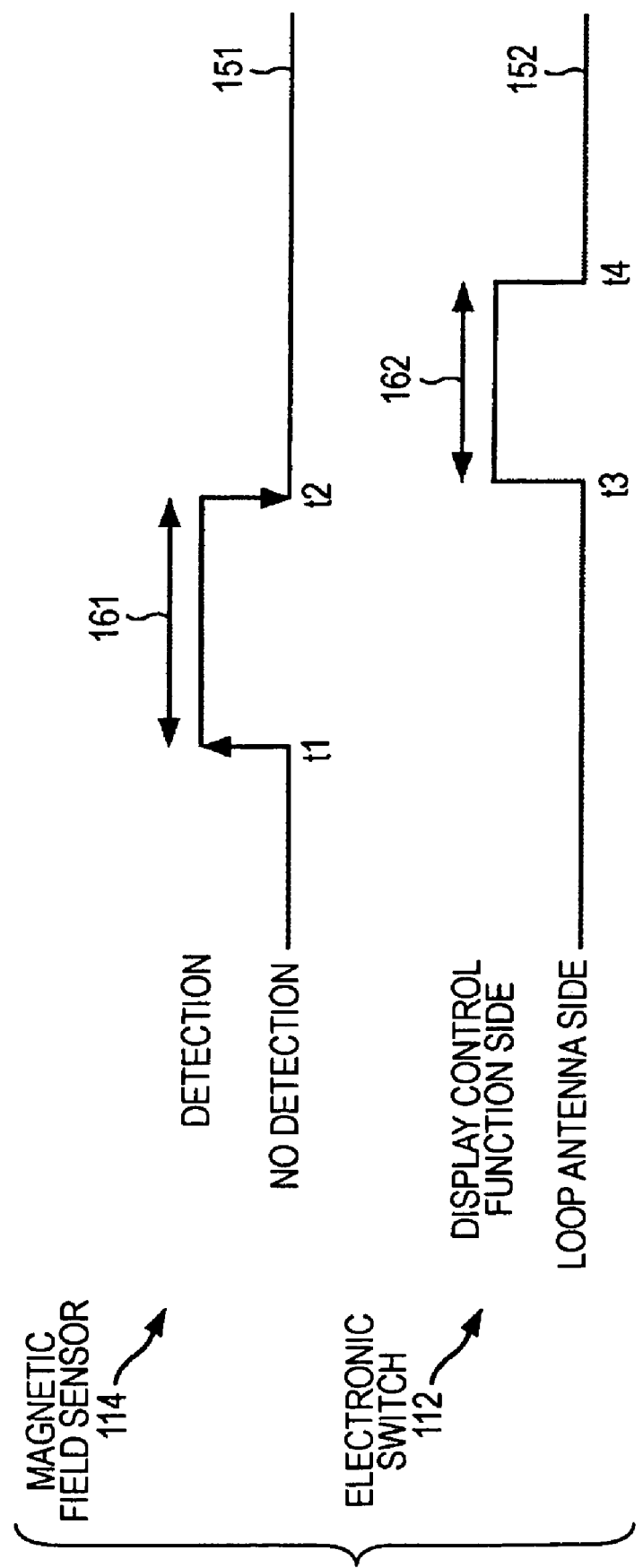
FIG. 3 is a diagram illustrating an example of the relationship between the detection result of a magnetic field sensor and the switching of an electronic switch.

A waveform 151 in FIG. 3 shows an example of the detection result of the magnetic field sensor 114 acquired by the condition determining section 131. The magnetic field sensor 114 indicates a variation in magnetic field by one of two values of "detection" and "no detection", and outputs the value as the detection result. That is, the magnetic field sensor 114 compares the magnitude of magnetic field variation against a predetermined threshold, determines that a magnetic field variation has been detected if the magnitude of magnetic field variation is equal to the threshold or higher (or larger than the threshold), and outputs a value indicating "detection" as the detection result to the condition determining section 131. Further, if the magnitude of magnetic field variation is smaller than the threshold (or equal to the threshold or lower), the magnetic field sensor 114 determines that a magnetic field variation has not been detected, and outputs a value indicating "no detection" as the detection result to the condition determining section 131. The value of this threshold is arbitrary. It should be noted, however, that the magnetic field sensor 114 is designed to detect the update of information on the EEPROM 121, that is, detect the reception of a signal transmitted from the reader/writer 101 by the loop antenna 113. Therefore, in order to prevent erroneous detection and detection failure, it is desirable that the value of the threshold be substantially equal to the value of the threshold used when making a determination in the non-contact IC card section 111 that a magnetic field variation that has occurred in the loop antenna 113 is due to a signal transmitted from the reader/writer 101.

When the loop antenna 113 receives the signal from the reader/writer 101, the detection result changes from "no detection" to "detection". Thereafter, communication is started between the non-contact IC card section 111 and the reader/writer 101, so the "detection" status of the detection result continues. When updating of the EEPROM 121 is finished and the communication ends, the magnetic field variation in the loop antenna 113 ceases, so the detection results returns from "detection" to "no detection".

For example, in the case of FIG. 3, as indicated by the waveform 151, the detection result of the magnetic field sensor 114 changes from "no detection" to "detection" at instant t1, and then returns to "no detection" at instant t2. The condition determining section 131 regards the above-mentioned change in which the detection result changes from "no detection" to "detection" and then further returns to "no detection" as the "predetermined condition", and upon determining that this condition has been satisfied, determines that updating of the EEPROM 121 has been performed and the updating has been finished.

When the condition determining section 131 determines that the condition has been satisfied, the electronic switch control section 132 controls the electronic switch 112 to switch the connection destination of the non-contact IC card section 111 from the loop antenna 113 to the display control section 115. Then, the information reading section 134 starts reading of information, and the time measuring section 133 starts time measurement. Then, upon the elapse of a predetermined time, the electronic switch control section 132 controls the electronic switch 112 again to switch the connection destination of the non-contact IC card section 111 from the display control section 115 to the loop antenna 113.

For example, in the case of FIG. 3, as indicated by a waveform 152, when the condition is satisfied at instant t2, the electronic switch 112 switches the connection destination of the non-contact IC card section 111 at instant t3 from the loop antenna 113 to the display control section 115. Thereafter, when reading of information by the information reading section 134 is performed, and the time measuring section 133 measures a predetermined time indicated by a two-headed arrow 162, at instant t4, the electronic switch 112 switches the connection destination of the non-contact IC card section 111 from the display control section 115 to the loop antenna 113.

At this time, in order to prevent erroneous detection, the condition determining section 131 may be further configured to measure the time duration of the "detection" status (have the time duration measured by the time measuring section 133, for example), and determines that "the condition is satisfied" only when the "detection" status has continued for a predetermined time or more. For example, in the case of FIG. 3, the time from instant t1 to instant t2, that is, the time indicated by the two-headed arrow 161 being a predetermined time or more may be included in the "condition" as well.

As described above, if a magnetic field variation is one due to a signal from the reader/writer 101, communication is performed thereafter, so there is a high probability that the "detection" status will continue for the predetermined time. Since the condition determining section 131 uses the time duration of the "detection" status by taking advantage of this fact, it is possible to prevent erroneous detection of an instantaneous magnetic field variation due to a factor other than a signal from the reader/writer 101.

The condition to be determined by the condition determining section 131 is arbitrary, and may of course differ from the one described above. For example, a configuration may be adopted in which the detection result of the magnetic field sensor 114 is represented by multiple values of three values or more, the waveform of the magnetic field variation that has occurred near the loop antenna 113 and is indicated by the detection result can be identified, and whether or not the waveform represents a signal from the reader/writer 101 is determined.

Next, referring to the flowchart of FIG. 4, an example of the flow of a display control process will be described.

When the display control process is started, in step S1, the electronic switch control section 132 of the display control section 115 controls the electronic switch 112 to connect the non-contact IC card section 111 to the loop antenna 113. In step S2, the display control section 115 determines whether or not to terminate the display control process, and if it is determined not to terminate the display control process, the display control section 115 advances the process to step S3. In step S3, the magnetic field sensor 114 detects a variation in magnetic field near the loop antenna 113, and supplies the detection result to the condition determining section 131.

The condition determining section 131 makes a determination with respect to the detection result in step S4, and determines whether or not a predetermined condition has been satisfied with respect to the detection result in step S5. If it is determined that the condition has not been satisfied, the condition determining section 131 returns the process to step S1, and causes the subsequent processes to be repeated. If it is determined in step S5 that the detection result has satisfied the predetermined condition, the condition determining section 131 advances the process to step S6. In step S6, the electronic switch control section 132 controls the electronic switch 112 to connect the non-contact IC card section 111 to the display control section 115.

After determining that the condition has been satisfied, in step S7, the condition determining section 131 causes the information reading section 134 to start an information reading process of reading information from the EEPROM 121 of the non-contact IC card section 111 that has been connected. The information reading process will be described later.

When the connection destination of the non-contact IC card section 111 is switched, in step S8, the time measuring section 133 starts time measurement. Then, in step S9, the time measuring section 133 determines whether or not a predetermined time set in advance has elapsed, and waits on standby until the predetermined time is determined to have elapsed. If it is determined that the predetermined time has elapsed, the time measuring section 133 returns the process to step S1, and the subsequent processes are repeated. That is, the electronic switch 112 is controlled by the electronic switch control section 132, and the connection destination of the non-contact IC card section 111 is returned to the loop antenna 113.

The processes from step S1 to step S9 are repeated in this way, and reading of information is performed every time information on the EEPROM 121 is updated. Then, if it is determined in step S2 to terminate the display control process, the display control section 115 terminates the display control process.

Figure 5:
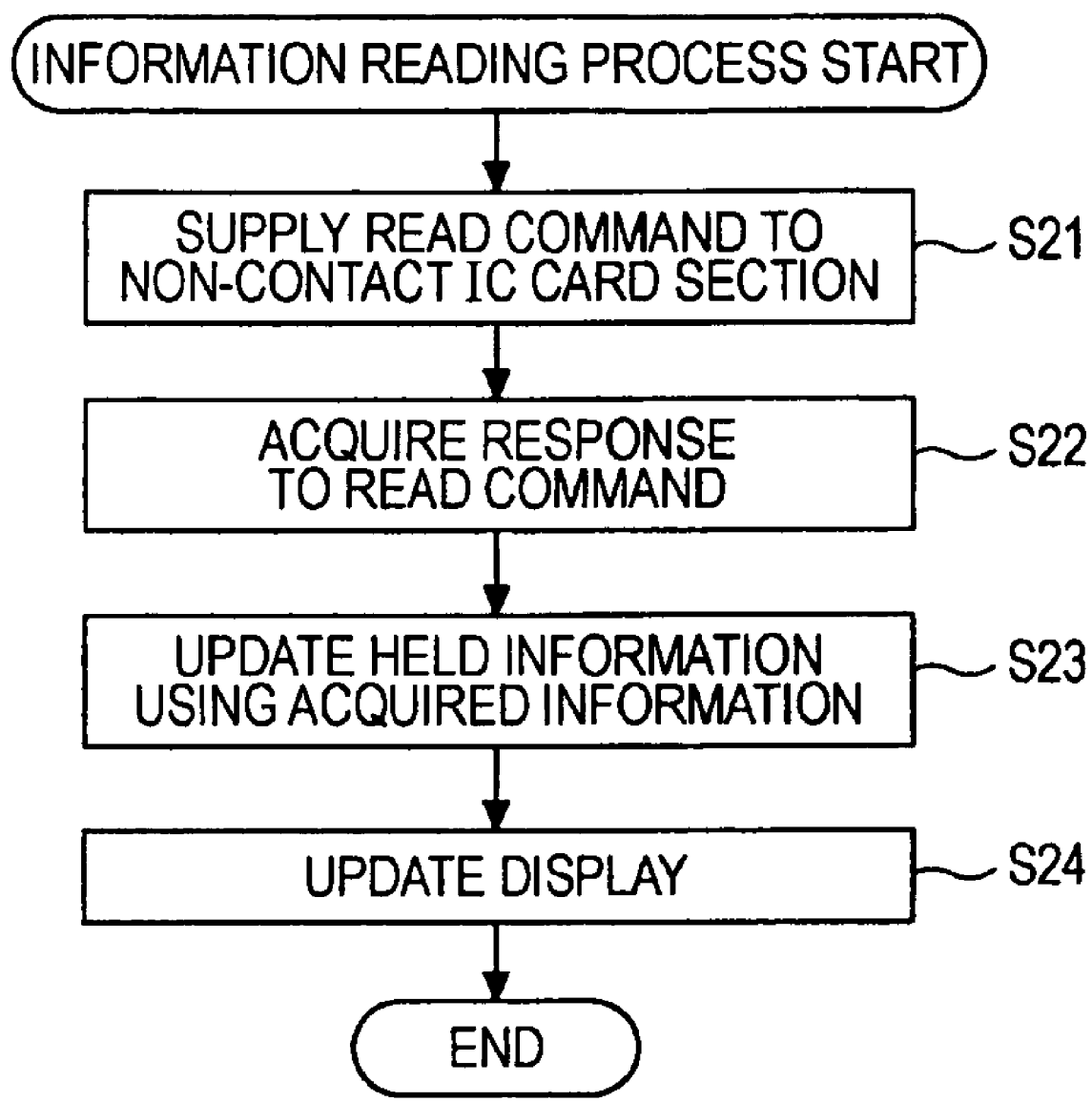
FIG. 5 is a flowchart illustrating an example of the flow of an information reading process.

Next, referring to the flowchart of FIG. 5, an example of the flow of the information reading process will be described.

When the information reading process is started in step S7 in FIG. 4, in step S21, the information reading section 134 supplies to the non-contact IC card section 111 a read command requesting for information stored on the EEPROM 121. In accordance with the request, the non-contact IC card section 111 reads information stored on the EEPROM 121, and supplies the read information to the display control section 115 as a response to the read command. In step S22, the information reading section 134 acquires the response to the read command, that is, the information read from the EEPROM 121.

In step S23, the held data updating section 135 updates information held on the EEPROM 122 by using the information acquired by the information reading section 134, that is, the information read from the EEPROM 121. In step S24, the display updating section 136 updates the display of the display device 116 by using the updated information held on the EEPROM 122. When the process of step S24 is finished, the information reading process is terminated.

As described above, the display control section 115 causes the magnetic field sensor 114 to detect a magnetic field variation in the vicinity of the loop antenna 113, and on the basis of the detection result, determines whether or not information stored on the EEPROM 121 has been updated. Only when the information has been updated, the display control section 115 controls the electronic switch 112 to connect the non-contact IC card section 111 to the display control section 115, thus reading information stored on the EEPROM 121. In this way, the display control section 115 prevents unnecessary access to the non-contact IC card section 111, thereby making it possible to prevent an increase in power consumption. In the case of a device in which power is supplied using a battery, in particular, the life of the battery can be extended, and due to the longer interval of battery replacement or recharge operation and the reduced number of times such an operation is required, the convenience of the device can be enhanced.

The prevention of unnecessary access to the non-contact IC card section 111 also makes it possible to prevent unnecessary updating of the display contents of the display device 116. Further, the display control section 115 holds information read from the EEPROM 121 onto the EEPROM 122, and updates the display contents of the display device 116 by using the information held on the EEPROM 122. Thus, for example, even in a case where the display contents of the display device 116 need to be updated regularly, it is possible to prevent unnecessary access to the non-contact IC card section 111 to thereby prevent an increase in power consumption.

The configuration of the non-contact IC card 100 may differ from that described above. For example, in a case where a device having the function of holding the contents of display, such as electronic paper, is used as the display device 116, even if the EEPROM 122 of the display control section 115 is omitted, it is possible to prevent unnecessary access to the non-contact IC card section 111 to thereby prevent an increase in power consumption.

Figure 6:
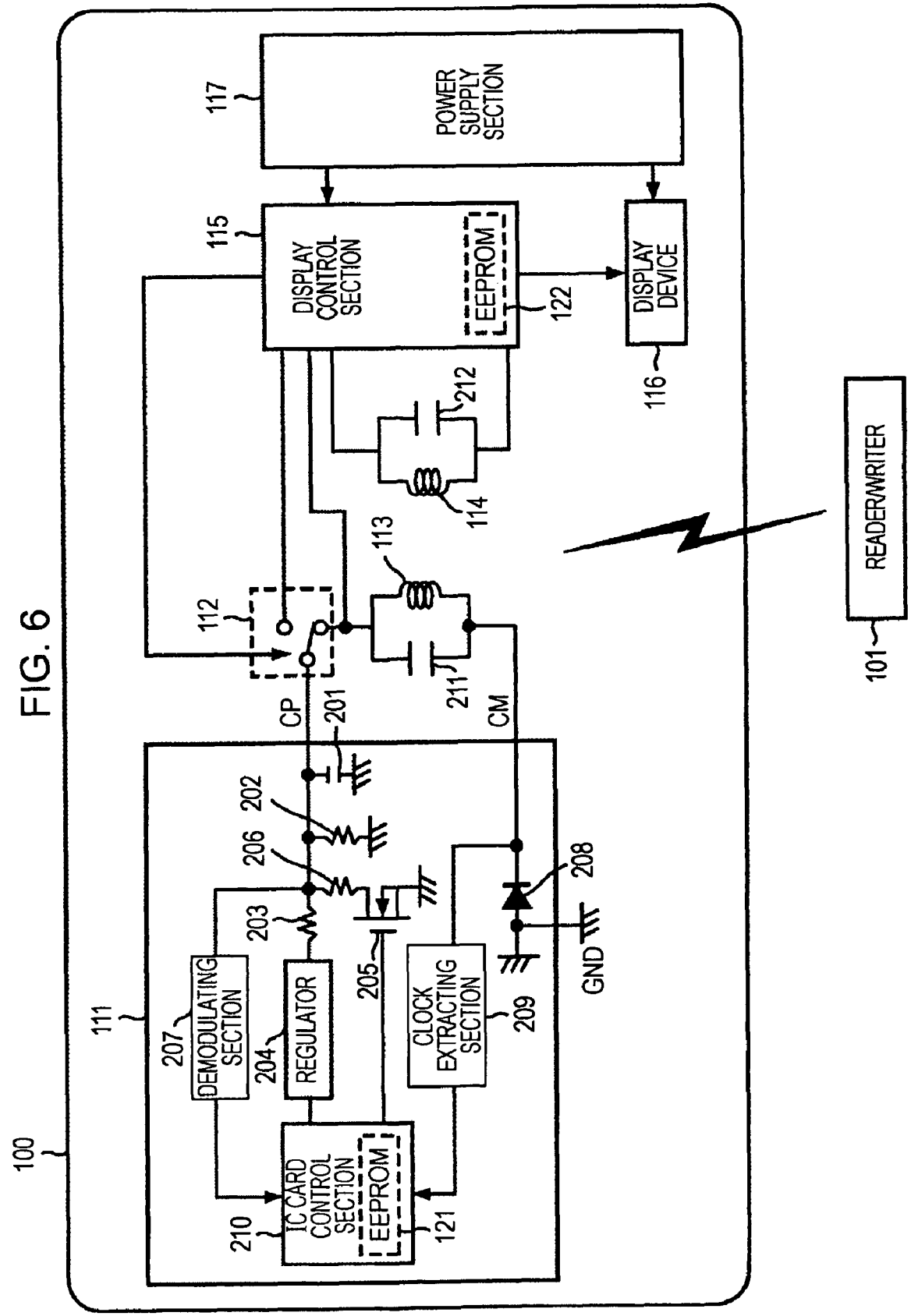
FIG. 6 is a block diagram showing another example of the configuration of a non-contact IC card according to an embodiment of the present invention.

Alternatively, for example, as the non-contact IC card section 111, there may be used an IC chip incorporated into a non-contact IC card with no display function which is currently in widespread use. FIG. 6 is a block diagram showing an example of the non-contact IC card in that case. That is, in the example shown in FIG. 6, as the non-contact IC card section 111, there is used an IC chip incorporated into a non-contact IC card with no display function which is currently in widespread use.

As shown in FIG. 6, in the case of the IC chip of the non-contact IC card that is currently in widespread use, power supply is effected by a signal supplied from the reader/writer 101. Therefore, the power supply section 117 does not supply power to the non-contact IC card section 111 but supplies power only to the display control section 115 and the display device 116.

The opposite terminals of the loop antenna 113 are connected to a CP terminal that is a signal input/output terminal of the non-contact IC card section 111, and a CM terminal that is a clock extraction terminal, in parallel to a capacitor 211. The connection to the CP terminal is made via the electronic switch 112. Inside the non-contact IC card section 111, one terminal of each of a capacitor 201, a resistor 202, and a resistor 203 is connected to the CP terminal. The other terminal of each of the capacitor 201 and the resistor 202 is grounded. A regulator 204 for rectifying a signal is connected to the other terminal of the resistor 203. An IC card control section 210 configured by a CPU or the like is connected to the other terminal of the regulator 204.

Also connected to the CP terminal are an input terminal of a demodulating section 207 that demodulates a modulation signal inputted from the CP terminal, and a resistor 206. An output terminal of the demodulating section 207 is connected to the IC card control section 210. A drain of an FET (Field Effect Transistor) 205 is connected to the other terminal of the resistor 206. A source of the FET 205 is grounded, and the IC card control section 210 is connected to the gate.

A diode 208 and an input terminal of a clock extracting section 209 are connected to the CM terminal. The other terminal of the diode is grounded, and an output terminal of the clock extracting section 209 is connected to the IC card control section 210. The IC card control section 210 carries out control processing or computation processing for the non-contact IC card 100 to realize its function as a non-contact IC card. The IC card control section 210 has the EEPROM 121 built therein.

At this time, like the loop antenna 113, a capacitor 212 is provided in parallel with the magnetic field sensor 114. While FIG. 6 depicts the loop antenna 113 and the magnetic field sensor 114 as being arranged laterally side by side for the sake of convenience, in actuality, the magnetic field sensor 114 has the same shape as that of the loop antenna 113, and is arranged so as to be superimposed on the loop antenna 113.

As described above, in the case of FIG. 6 mentioned above as well, as in the case of FIG. 1, by using the detection of a magnetic field variation in the vicinity of the loop antenna 113 by the magnetic field sensor 114, it is possible to prevent an increase in power consumption due to unnecessary updating of the display contents. In the case of FIG. 6 mentioned above, since power is not supplied to the non-contact IC card section 111 from the power supply section 117, when accessing the non-contact IC card section 111, the display control section 115 needs to supply a signal that allows the non-contact IC card section 111 to generate a power voltage (the same signal as the signal transmitted from the reader/writer 101). In other words, by reducing necessary access to the non-contact IC card section 111, supply of power to the non-contact IC card section 111 is further reduced, thereby making it possible to further reduce an increase in power consumption. Further, the use of the IC chip of the non-contact IC card currently in widespread use makes it possible to reduce the development cost of the non-contact IC card 100.

Other than the above-mentioned configuration, a configuration may be adopted in which, for example, when access is made from the reader/writer 101 while the non-contact IC card section 111 is accessed by the display control section 115, priority is given to the access from the reader/writer 101.

Since the display of information on the EEPROM 121 is performed in order to display the processing result as an IC card, in normal cases, a slight delay in display does not cause any practical problem. On the other hand, the communication with the reader/writer 101 is performed only when the non-contact IC card 100 and the reader/writer 101 are brought into close proximity to each other. In normal cases, it is difficult to maintain this communication-enabled state (position) for a long time, and an increase in the time of this communication process leads to an increase in user's operation time, which may in turn lead to a decrease in the convenience of the non-contact IC card 100. That is, immediacy is required for the communication between the non-contact IC card 100 and the reader/writer 101.

As described above, a higher priority is given to the communication between the non-contact IC card 100 and the reader/writer 101 than to the display of information held on the EEPROM 121. Therefore, when access is made from the reader/writer 101 during access to the non-contact IC card section 111 from the display control section 115, a priority is given to the access from the reader/writer 101, thereby making it possible to improve the convenience of the non-contact IC card.

Figure 7:
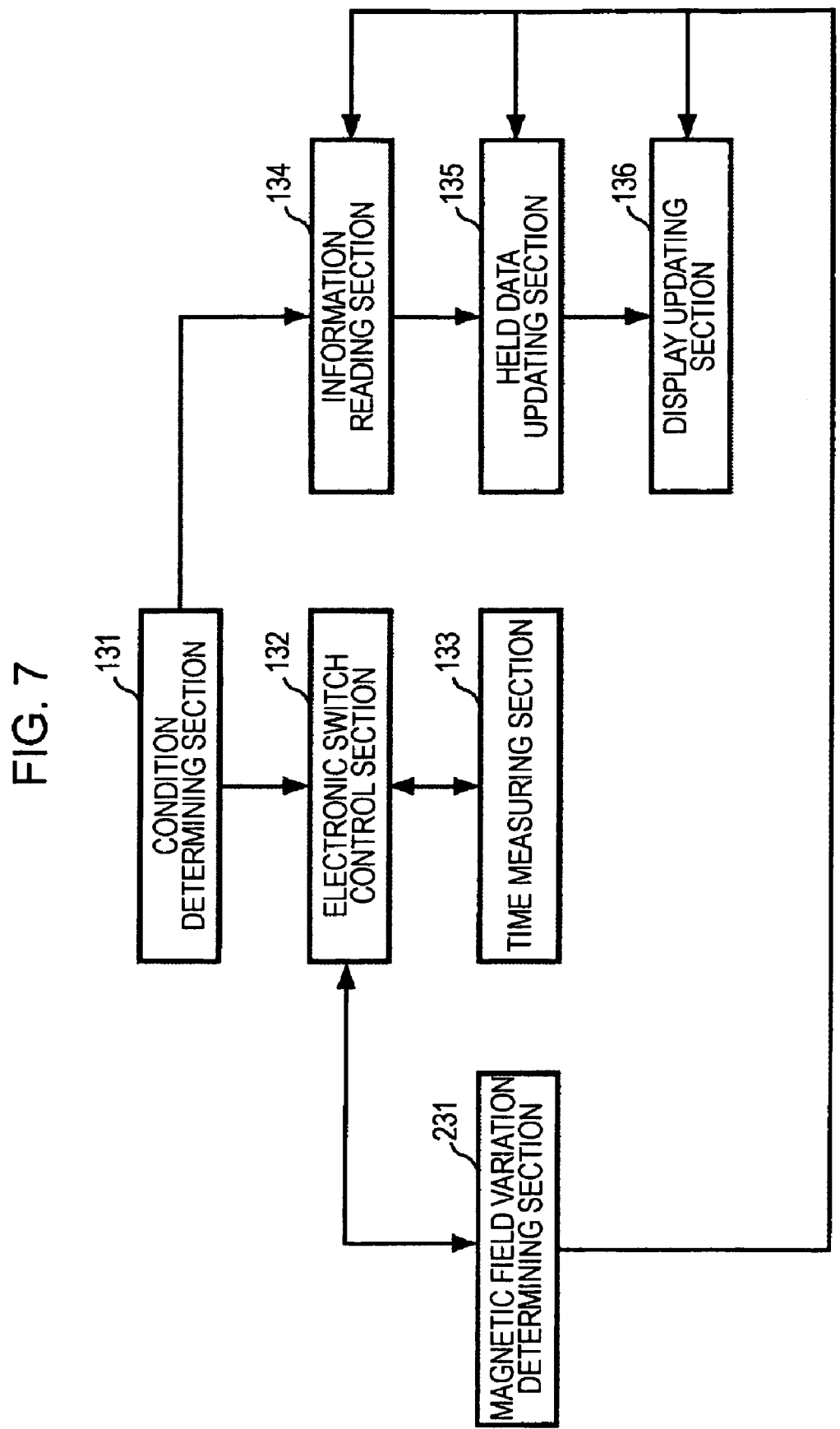
FIG. 7 is a functional block diagram showing another example of functions included in the display control section shown in FIG. 1.

FIG. 7 shows an example of functions included in the display control section 115 in that case. In FIG. 7, in addition to the configuration shown in FIG. 2, the display control section 115 further has a magnetic field variation determining section 231.

The magnetic field variation determining section 231 acquires the detection result of the magnetic field sensor 114 while the electronic switch control section 132 controls the electronic switch 112 to connect the non-contact IC card section 111 to the display control section 115. On the basis of the detection result, the magnetic field variation determining section 231 determines whether or not a magnetic field variation has occurred in the vicinity of the loop antenna 113. That is, the magnetic field variation determining section 231 determines whether or not the detection result of the magnetic field sensor 114 has changed from "no detection" to "detection".

If it is determined that the detection result has changed to "detection", the magnetic field variation determining section 231 gives a notification to that effect to the electronic switch control section 132. On the basis of this notification, the electronic switch control section 132 controls the electronic switch 112 to return the connection destination of the non-contact IC card section 111 to the loop antenna 113, before the reception of the time measurement result from the time measuring section 133. The non-contact IC card section 111 can thus communicate with the reader/writer 101.

Further, if it is determined that the detection result has changed to "detection", the magnetic field variation determining section 231 further controls the information reading section 134, the held data updating section 135, and the display updating section 136 to terminate the information reading process described above with reference to the flowchart of FIG. 5.

The relationship between the detection result of the magnetic field sensor 114 and the switching of the electronic switch 112 at this time will be described with reference to FIG. 8.

Figure 8:
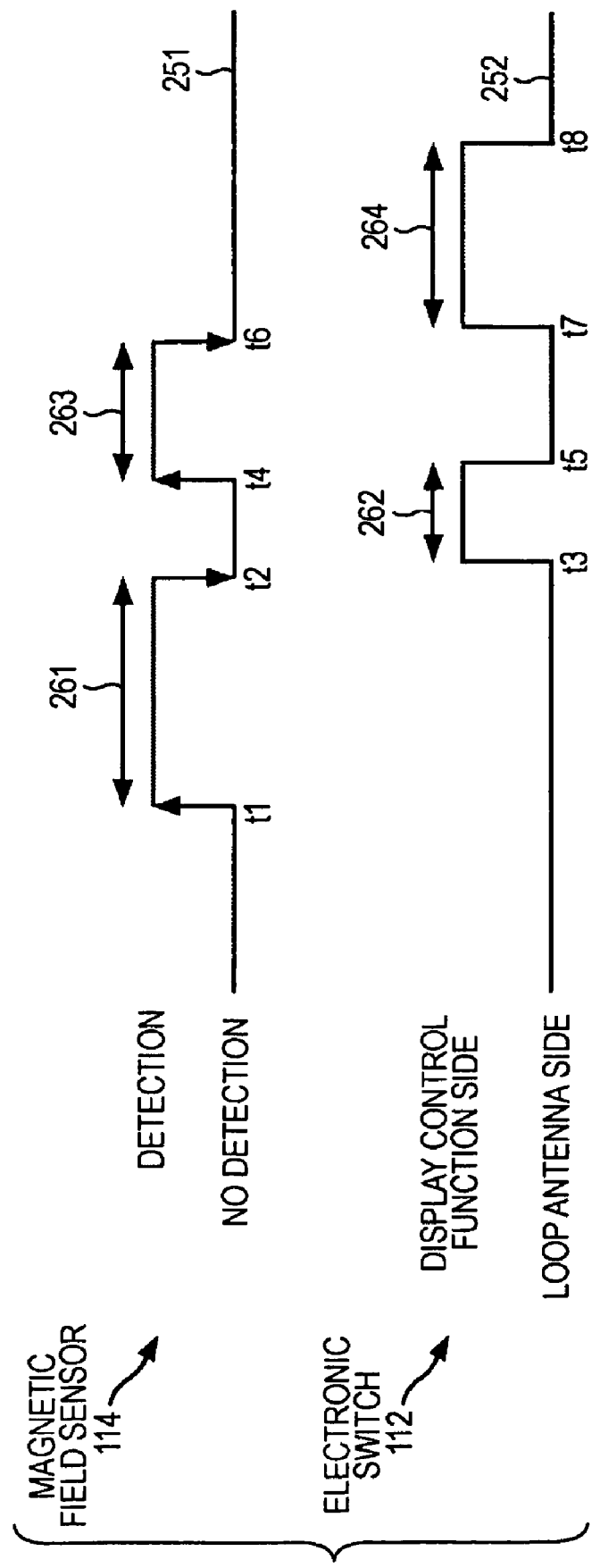
FIG. 8 is a diagram illustrating another example of the relationship between the detection result of a magnetic field sensor and the switching of an electronic switch.

As indicated by a waveform 251 shown in FIG. 8, when the detection result of the magnetic field sensor 114 changes from "no detection" to "detection" at instant t1, and the detection result further changes from "detection" to "no detection" at instant t2 after the elapse of a time 261, then the condition determining section 131 determines that information on the EEPROM 121 has been updated. The electronic switch control section 132 controls the electronic switch 112 on the basis of the determination result so that at instant t3, as indicated by a waveform 252, the connection destination of the non-contact IC card section 111 is switched from the loop antenna 113 to the display control section 115. At this time, reading of information stored on the EEPROM 121 is started by the information reading section 134.

Further, at this time, the magnetic field variation determining section 231 starts observation of the detection result of the magnetic field sensor 114. When the detection result changes from "no detection" to "detection" at instant t4, the magnetic field variation determining section 231 determines that a magnetic field variation has occurred. On the basis of the determination result, the electronic switch control section 132 controls the electronic switch 112, and at instant t5 after the elapse of a time 262 from instant t3, switches the connection destination of the non-contact IC card section 111 from the display control section 115 to the loop antenna 113. At this time, the information reading process is forcibly terminated, and communication between the non-contact IC card section 111 and the reader/writer 101 is started.

Then, when the communication between the reader/writer 101 and the non-contact IC card section 111 is finished at instant t6 after the elapse of a time 263 from instant t4, the detection result of the magnetic field sensor 114 changes from "detection" to "no detection". On the basis of this change, the condition determining section 131 determines that the condition has been satisfied again due to the change at instant t4 and the change at instant t6. On the basis of this determination result, at instant t7, the electronic switch control section 132 controls the electronic switch 112 to switch the connection destination of the non-contact IC card section 111 from the loop antenna 113 to the display control section 115.

At this time, reading of information stored on the EEPROM 121 is started again by the information reading section 134, and further, observation of the detection result of the magnetic field sensor 114 is started again by the magnetic field variation determining section 231. Thereafter, upon the elapse of a time 264 without the occurrence of a magnetic field variation being detected by the magnetic field variation determining section 231, the time measuring section 133 gives to the electronic switch control section 132 a notification that a predetermined time has elapsed. On the basis of this notification, at instant t8, the electronic switch control section 132 switches the connection destination of the non-contact IC card section 111 from the display control section 115 to the loop antenna 113.

An example of the flow of the display control process at this time will be described with reference to the flowchart of FIG. 9.

Figure 9:
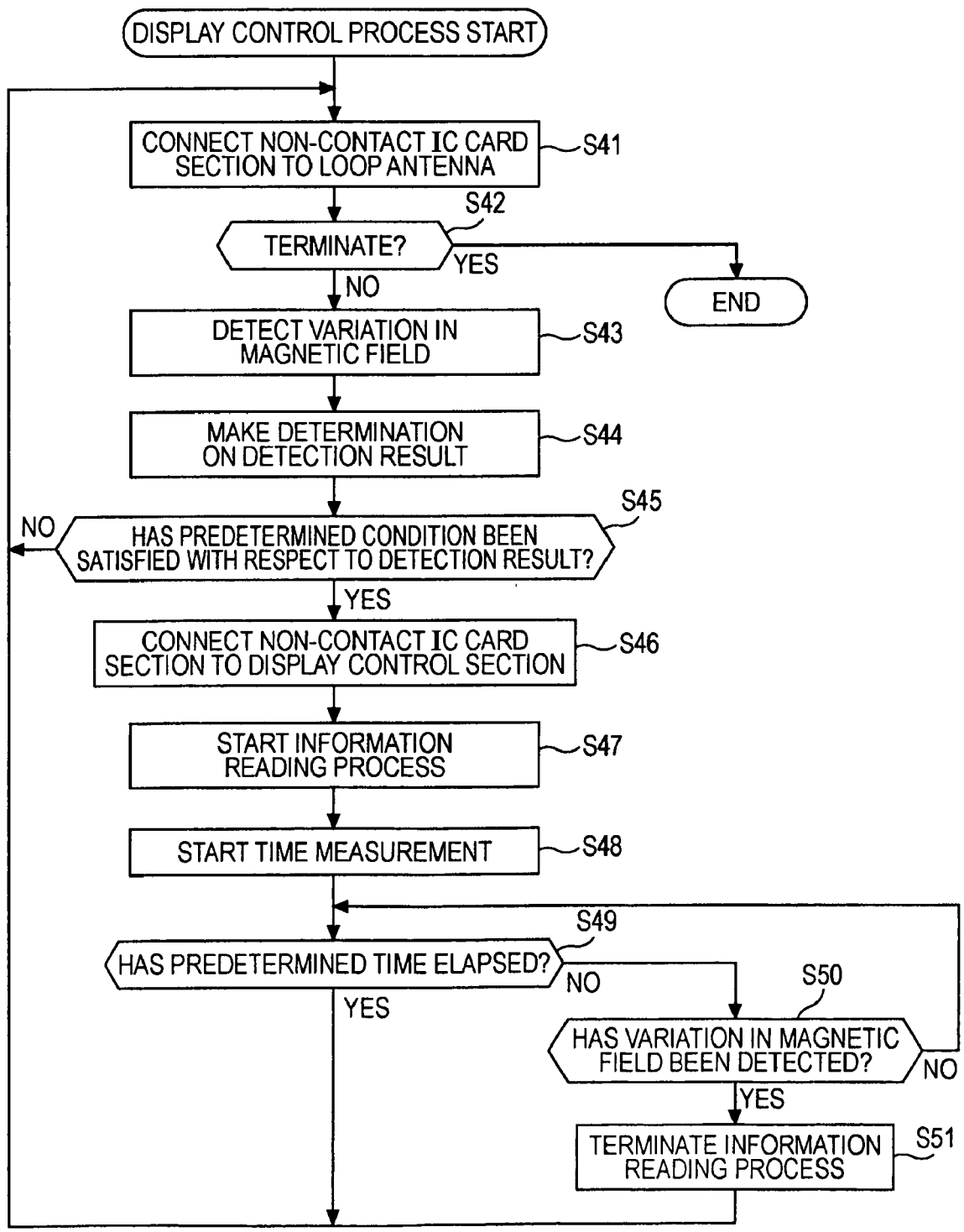
FIG. 9 is a flowchart illustrating another example of the flow of a display control process.

As shown in FIG. 9, the respective sections of the display control section 115, and the magnetic field sensor 114 handle respective processes of steps S41 to S49 in the same manner as the respective processes of step S1 to S9 shown in FIG. 4.

Then, if it is determined in step S49 that a predetermined time has not elapsed, the process is advanced to step S50. In step S50, the magnetic field variation determining section 231 determines whether or not a magnetic field variation has been detected, and if it is determined that a magnetic field variation has not been detected, the magnetic field variation determining section 231 returns the process to step S49, and repeats the subsequent processes.

If it is determined in step S50 that a magnetic field variation has been detected, the magnetic field variation determining section 231 advances the process to step S51, where the magnetic field variation determining section 231 controls the information reading section 134, the held data updating section 135, and the display updating section 136 to forcibly terminate the information reading process. When the process of step S51 is finished, the magnetic field variation determining section 231 returns the process to step S41, and causes the subsequent processes to be repeated. That is, the electronic switch control section 132 controls the electronic switch 112 to connect the non-contact IC card section 111 to the loop antenna 113 again (step S41).

In this way, the display control section 115 allows the communication with the reader/writer 101 to take priority over the display of information stored on the EEPROM 121, thereby making it possible to enhance the convenience of the non-contact IC card 100.

Figure 10:
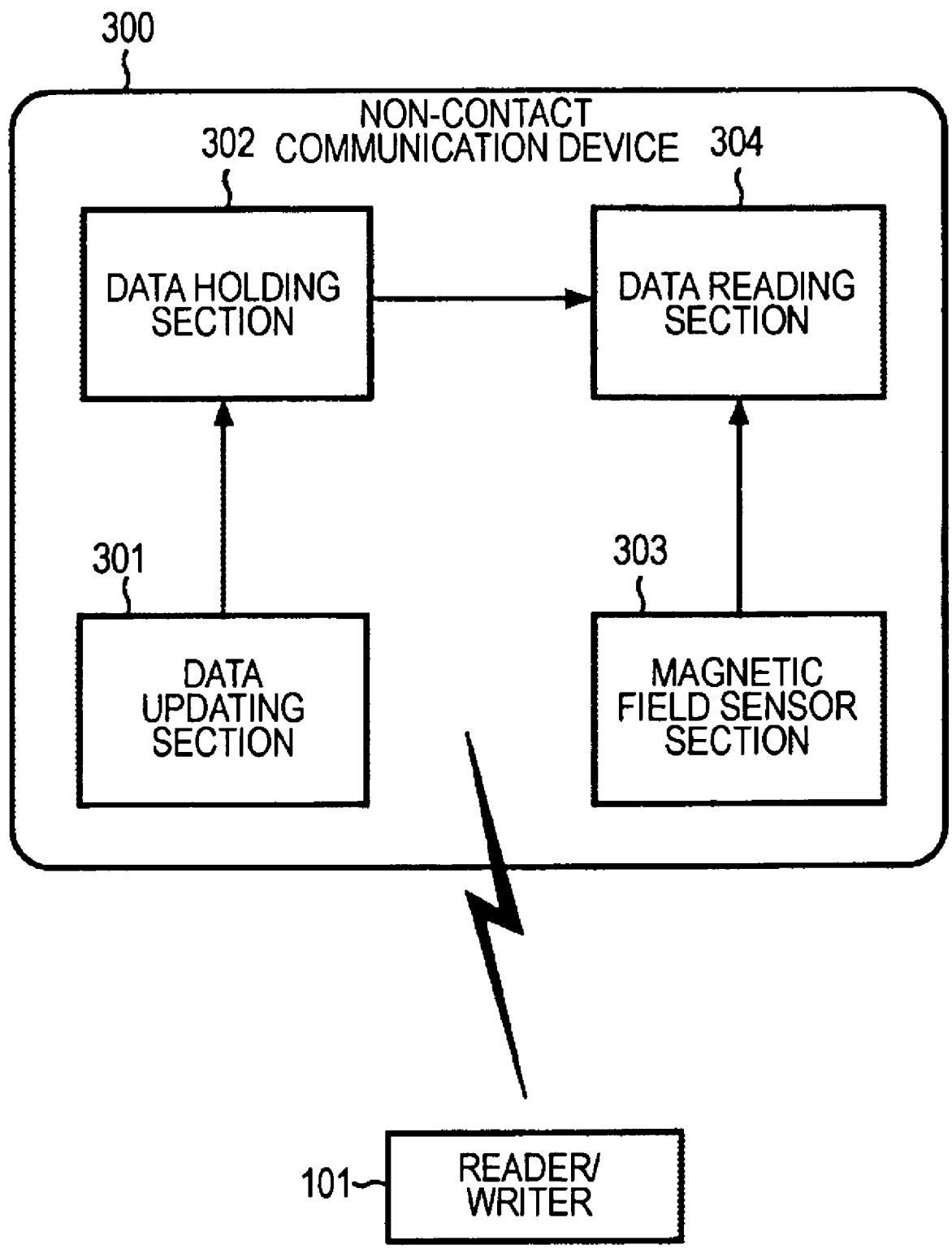
FIG. 10 is a block diagram showing an example of the configuration of a non-contact communication device according to an embodiment of the present invention.

While the foregoing description is directed to the non-contact IC card 100, the present invention is applicable to devices other than a non-contact IC card. FIG. 10 shows an example of such an application. In FIG. 10, a non-contact communication device 300 is a device that communicates with the reader/writer 101 as another device in a non-contact manner. The non-contact communication device 300 has a data updating section 301 that updates data through communication with the reader/writer 101, a data holding section 302 that holds the updated data, a magnetic field sensor section 303 that detects a magnetic field signal transmitted from the reader/writer section 101, and a data reading section 304 which, only when information held on the data holding section 302 has been updated by the magnetic field signal transmitted from the reader/writer 101 on the basis of the detection result of the magnetic field sensor section 303, reads the corresponding information from the data holding section 302.

These functions of the non-contact communication device 300 make it possible to prevent an increase in power consumption due to unnecessary reading of information. The information thus read may be used for purposes other than the update of display.

The present invention is applicable to any kind of device as long as the device has these functions.

While the series of processes described above can be executed by hardware, it can be also executed by software. If the series of processes is to be executed by software, a program constituting the software is installed from a program recording medium to a computer embedded in dedicated hardware, a general purpose personal computer capable of executing various functions when installed with various programs, for example, an information processing apparatus of an information processing system made up of a plurality of apparatuses, or the like.

This recording medium is configured not only by a removable medium formed by a magnetic disc (including a flexible disc), an optical disc (including a CD-ROM (Compact Disc-Read Only Memory) and a DVD (Digital Versatile Disc)), a magneto-optical disc (including an MD (Mini-Disc)(registered trademark)), a semiconductor memory, or the like recording a program, which is distributed to the users separately from the main body of the apparatus to deliver the program, but also by the EEPROM 121, the EEPROM 122, or the like recording a program, which is delivered to the user while being embedded in the main body of the apparatus in advance.

It should be noted that in this specification, the steps describing the program recorded on the recording medium include not only processes that are executed time sequentially in the order as they appear in the description, but also processes that are not executed time sequentially but executed in parallel or independently.

It should be noted that the configuration described above as constituting a single apparatus may be divided into a plurality of apparatuses. Conversely, the configurations described above as constituting a plurality of apparatuses may be combined into a single apparatus. Configurations other than those described above may of course be added to the configuration of each apparatus. Further, as far as the configuration or operation of the system as a whole remains substantially the same, a part of the configuration of a given apparatus may be included in the configuration of another apparatus. That is, the embodiment of the present invention is not limited to the embodiments described above, but various modifications are possible without departing from the scope of the present invention.

What is claimed is:

1. An information processing apparatus comprising:
receiving means for receiving a magnetic field signal;
storage means for storing information included in the magnetic field signal received by the receiving means;
detecting means for detecting a magnetic field variation that occurs in the vicinity of the receiving means;
condition determining means for determining whether or not a detection result of the detecting means satisfies a predetermined condition that is set in advance;
switching control means for controlling a switching section that switches a connection destination of the storage means on the basis of a determination result of the condition determining means; and
reading means for reading information stored on the storage means if it is determined by the condition determining means that the detection result satisfies the condition,
wherein the switching control means controls the switching section to connect the storage means to the receiving means if it is determined by the condition determining means that the detection result does not satisfy the condition, and controls the switching section to connect the storage means to the reading means if it is determined by the condition determining means that the detection result satisfies the condition.

2. The information processing apparatus according to claim 1, wherein:
the condition is that as the detection result, a magnitude of the magnetic field variation detected becomes larger than a predetermined threshold, and then becomes smaller than the threshold.

3. The information processing apparatus according to claim 1, wherein:
the condition is that as the detection result, a magnitude of the magnetic field variation that has been detected becomes larger than a predetermined threshold, and then becomes smaller than the threshold after elapse of a predetermined time.

4. The information processing apparatus according to claim 1, further comprising:
   holding means for holding information; and
   held information updating means for updating information held on the holding means, by using the information read from the storage means by the reading means.

5. The information processing apparatus according to claim 4, further comprising:
   display means for displaying image information; and
   display updating means for updating the image information to be displayed by the displayed means, by using the information held by the holding means.

6. The information processing apparatus according to claim 1, further comprising:
   time measuring means for measuring time,
   wherein the switching control means controls the switching section to connect the storage means to the reading means if it is determined by the condition determining means that the detection result satisfies the condition, and when it is further determined by the time measuring means that a predetermined time has elapsed, the switching control means controls the switching section to connect the storage means to the receiving means.

7. The information processing apparatus according to claim 1, further comprising:
   magnetic field variation determining means for determining whether or not the magnetic field variation has occurred in the vicinity of the receiving means, on the basis of the detection result of the detecting means,
   wherein the switching control means controls the switching section to connect the storage means to the receiving means if it is further determined by the magnetic variation determining means that the magnetic field variation has occurred in the vicinity of the receiving means.

8. An information processing method comprising the steps of:
   detecting a magnetic field variation that occurs in the vicinity of a receiving section that receives a magnetic field signal;
   determining whether or not a detection result satisfies a predetermined condition that is, set in advance;
   connecting a storage section, which stores information included in the magnetic field signal received by the receiving section, to the receiving section if it is determined that the detection result does not satisfy the condition; and
   connecting the storage section to a reading section that reads information stored on the storage section, if it is determined that the detection result satisfies the condition.

9. A non-contact IC card device which includes an antenna that receives a magnetic field signal transmitted from another device, a memory that stores information included in the magnetic field signal received via the antenna, and a display device that displays information, comprising:
   detecting means for detecting a magnetic field variation that occurs in the vicinity of the antenna;
   condition determining means for determining whether or not a detection result of the detecting means satisfies a predetermined condition that is set in advance;
   switching control means for controlling an electronic switch, which switches a connection destination of the memory on the basis of a determination result of the condition determining means, to connect the memory to the antenna if it is determined that the detection result does not satisfy the condition, and to detach the memory from the antenna if it is determined that the detection result satisfies the condition; and
   display control means for reading information stored on the memory for display on the display device, in a state in which the memory is detached from the antenna by control of the switching control means.

10. An information processing apparatus comprising:
    a receiving section that receives a magnetic field signal;
    a storage section that stores information included in the magnetic field signal received by the receiving section;
    a detecting section that detects a magnetic field variation that occurs in the vicinity of the receiving section;
    a condition determining section that determines whether or not a detection result of the detecting section satisfies a predetermined condition that is set in advance;
    a switching control section that controls a switching section that switches a connection destination of the storage section on the basis of a determination result of the condition determining section; and
    a reading section that reads information stored on the storage section if it is determined by the condition determining section that the detection result satisfies the condition,
    wherein the switching control section controls the switching section to connect the storage section to the receiving section if it is determined by the condition determining section that the detection result does not satisfy the condition, and controls the switching section to connect the storage section to the reading section if it is determined by the condition determining section that the detection result satisfies the condition.

11. A non-contact IC card device which includes an antenna that receives a magnetic field signal transmitted from another device, a memory that stores information included in the magnetic field signal received via the antenna, and a display device that displays information, comprising:
    a detecting section that detects a magnetic field variation that occurs in the vicinity of the antenna;
    a condition determining section that determines whether or not a detection result of the detecting section satisfies a predetermined condition that is set in advance;
    a switching control section that controls an electronic switch, which switches a connection destination of the memory on the basis of a determination result of the condition determining section, to connect the memory to the antenna if it is determined that the detection result does not satisfy the condition, and to detach the memory from the antenna if it is determined that the detection result satisfies the condition; and
    a display control section that reads information stored on the memory for display on the display device, in a state in which the memory is detached from the antenna by control of the switching control section.

* * * * *